April 23, 1929. L. G. COPEMAN Re. 17,278
SHARP FREEZING CONTAINER FOR MECHANICAL REFRIGERATORS
Original Filed May 3, 1926 2 Sheets-Sheet 1
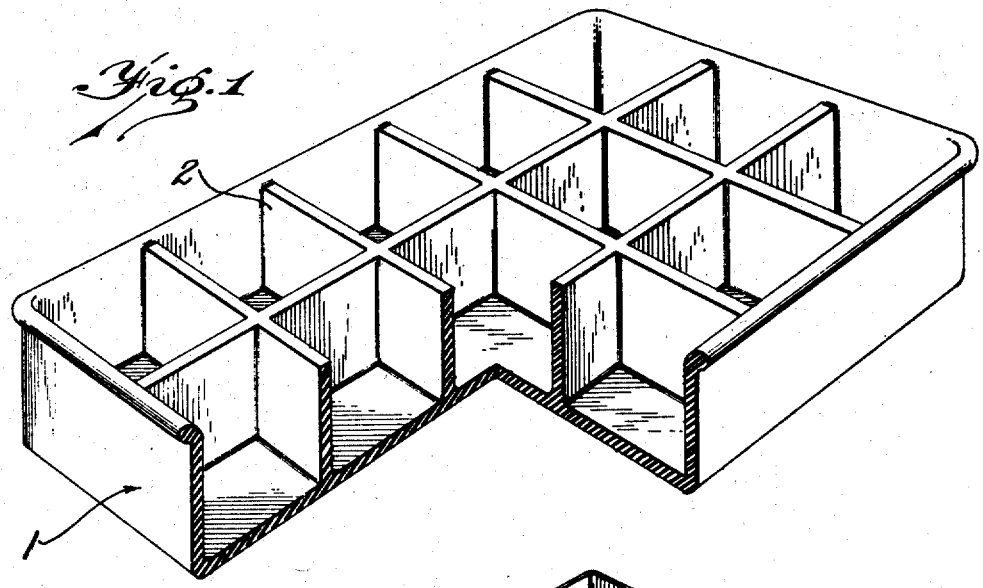
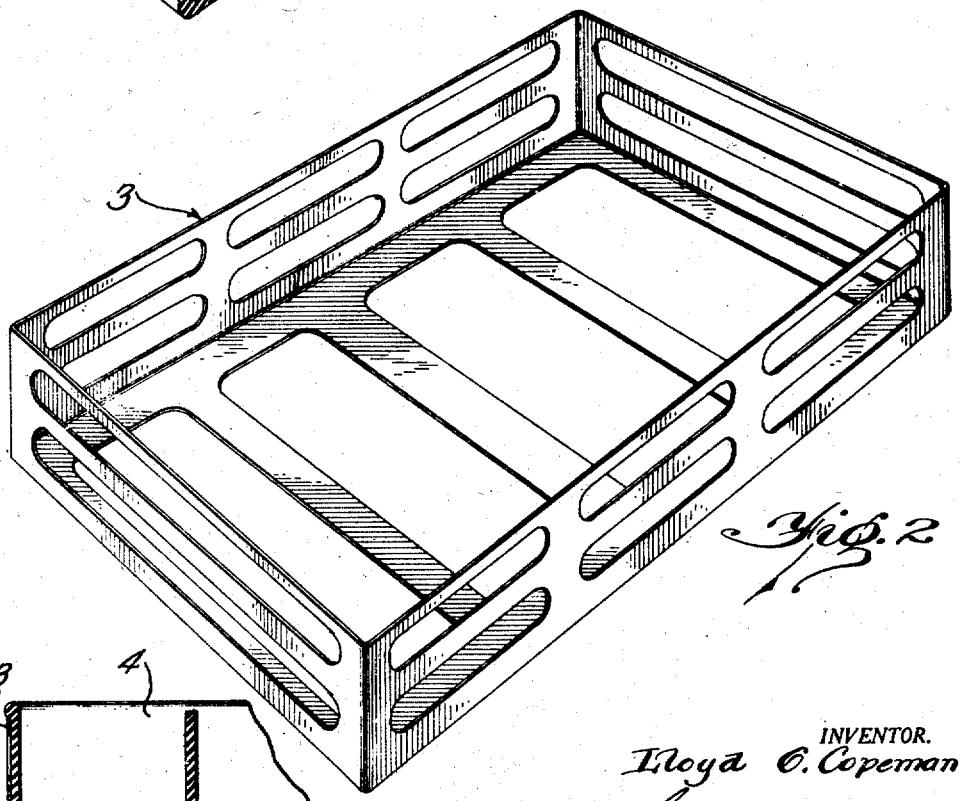
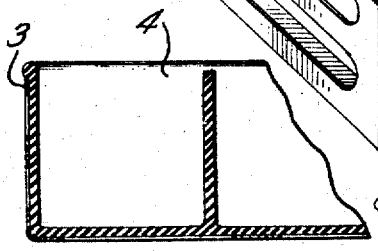
Fig. 2a
INVENTOR.
Lloyd G. Copeman
BY Stuart G. Barnes
ATTORNEY.

April 23, 1929. L. G. COPEMAN Re. 17,278
SHARP FREEZING CONTAINER FOR MECHANICAL REFRIGERATORS
Original Filed May 3, 1928 2 Sheets-Sheet 2
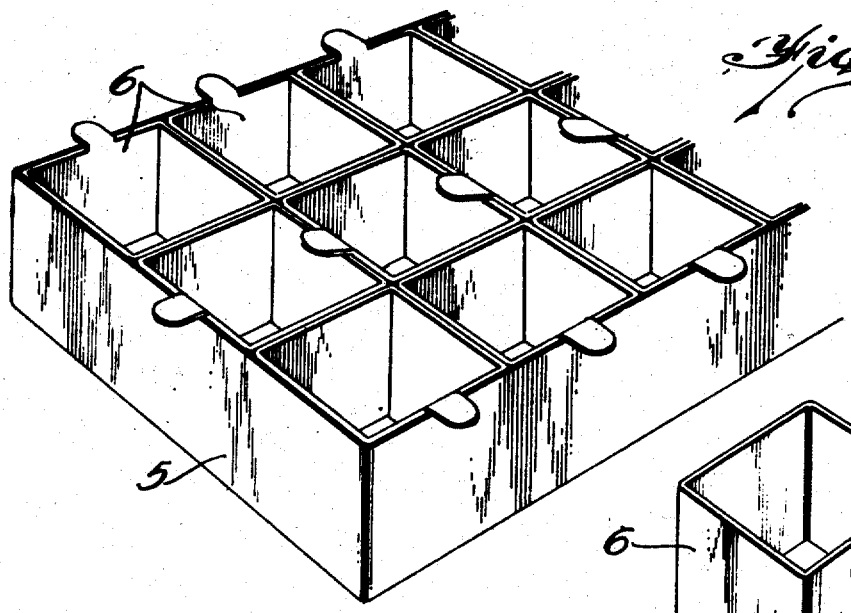
Fig. 3
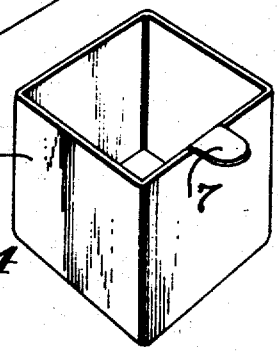
Fig. 4
Fig. 5
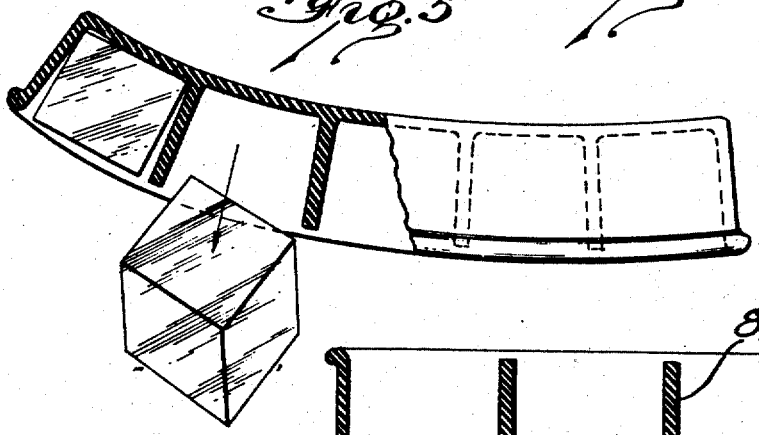
Fig. 6
INVENTOR.
Lloyd G. Copeman.
BY Stuart G. Barnes
ATTORNEY.

Reissued Apr. 23, 1929. Re. 17,278

UNITED STATES PATENT OFFICE

LLOYD G. COPEMAN, OF FLINT, MICHIGAN, ASSIGNOR TO COPEMAN LABORATORIES COMPANY, OF FLINT, MICHIGAN, A CORPORATION OF MICHIGAN.

SHARP FREEZING CONTAINER FOR MECHANICAL REFRIGERATORS.

Original No. 1,675,599, dated July 3, 1928, Serial No. 274,717, filed May 3, 1928. Application for reissue filed January 4, 1929. Serial No. 330,359.

DIVISION A

This invention relates to sharp freezing containers for mechanical refrigerators, and has to do particularly with a novel structure for forming ice cubes and the like, and the method of separating and releasing the ice cubes when desired.

Practically every domestic refrigerator embodying automatic refrigeration is provided with a low side or cooling unit having sharp freezing chambers for the reception of one or more trays, commonly called ice cube trays. Any one who has used these ice trays has experienced the difficulty of removing the ice cubes from the tray, it usually being necessary to either hold the tray up side down under running warm water to release the entire batch of ice cubes and then remove them one by one from the frame, or to direct the hot water at one particular point on the top or bottom of the tray to only release a few of the ice cubes at one time. This operation is not only tedious and messy but results in a material melting away of the ice cubes obtained and also results in material melting of the other ice cubes left in the tray and replaced in the refrigerator. Furthermore, the door of the refrigerator is frequently left open during this procedure and the length of time hitherto required to separate and obtain one or more ice cubes has resulted in a material warming of the refrigerator interior and a consequent reduction in efficiency.

It is the object of the present invention to provide sharp freezing trays for the freezing of ice cubes and the like, which are of such composition and such flexibility as to permit distortion thereof and quick removal of one or more ice cubes without any heating or melting of the tray, the only step required being the distortion of all or a portion of the tray.

This novel sharp freezing container is preferably obtained by forming the tray or a portion thereof out of a flexible material such as rubber, preferably molded. Each ice cube is therefore formed within flexible or distortable walls the distortion of which permits easy separation and/or removal of the ice cubes. This will be true regardless of whether each ice cube is formed in an individual container of flexible material or the complete tray is made up of flexible material.

In the drawings:

Figure 1 is a perspective view, partly cut away, of an ice cube tray embodying my invention.

Fig. 2 is a perspective view of a reinforcing tray or frame such as might be utilized for reinforcing the ice cube tray shown in Fig. 1.

Fig. 2ª is a fragmentary sectional view of a flexible ice cube tray similar to that shown in Fig. 1, as assembled in a reinforcing frame such as shown in Fig. 2.

Fig. 3 is a fragmentary perspective view of a sharp freezing container for individual ice cube cups.

Fig. 4 is a perspective view of one of the cups as shown in Fig. 3.

Fig. 5 is a diagrammatic view illustrating the manner of separating and removing ice cubes from a container such as shown in Fig. 1.

Fig. 6 is a cross sectional view of an ice cube container similar to that shown in Fig. 1, but being provided with a reinforcing plate in the bottom thereof.

The gist of the present invention relates to the forming of a sharp freezing container, such as ice cube trays, out of a flexible material, and while I have shown a preferred form and several modifications, it will be obvious that these may be varied to a considerable extent without departing from the basic idea embodied therein.

In Fig. 1 I have shown an integral ice cube tray which may be generally designated 1. This tray is preferably formed of molded rubber of a consistency which will withstand the freezing action of the ice cubes. In the embodiment shown in Fig. 1, while the tray is formed integrally and is thus flexible it is also so formed as to be inherently reinforced in order to stand up when filled with water and inserted in the cooling unit of the refrigerating system. Suitable partitions 2 are formed integrally with the sides of the container and are of course likewise formed of rubber. Such partitions may vary considerably as to thickness and height.

In Fig. 2 I have shown what may be termed an addition to the structure shown in Fig. 1, or a modification thereof. The frame shown in Fig. 2 may be generally designated 3 and is preferably perforated, as shown, whereby to provide just enough stiffness to hold the rubber tray in place. It will be obvious that if such a frame, as shown in Fig. 1, is utilized the rubber container tray may be much thinner and even of much greater resiliency. Such a frame and tray is shown as at 4 in Fig. 2[a].

When such a frame as 3 is utilized as a reinforcing medium, it will be obvious that the rubber tray can either be completely removed or the frame itself may be of such flexible material as to be distortable with the rubber container. The openings in the bottom of the frame may also be readily ntilized in flexing the rubber container to separate and discharge the ice cubes.

A further modification of the present invention is shown in Fig. 3 wherein a standard tray 5 may be utilized to receive a plurality of individual containers 6. These containers 6 are preferably formed of molded rubber, and each is preferably provided with a suitable tab 7 to permit ready removal thereof from the tray. It will be obvious that a frame such as shown in Fig. 2, or a flat frame having apertures, may also be used for receiving and positioning the individual cup 6. When individual containers such as 6 are utilized it will be obvious that they may be made of very flexible material and independently removed from the tray. Not only may the walls of such container 6 be flexed to discharge the ice cubes but I have found that the entire container may be turned inside out to quickly and positively discharge the ice cubes.

Very frequently it is desirable to obtain only one or two ice cubes at a time and by utilizing such single containers it is possible to very quickly remove the single container from its tray or frame and discharge the ice cubes therefrom. Such ice cubes will be in their whole, normal and comparatively dry condition.

In Fig. 6 I have shown a further modification of my structure wherein the upper walls 8 are formed of molded rubber and the bottom wall reinforced by a suitable plate 9 which is preferably perforated. This bottom plate 9 will give the entire tray necessary rigidity so that it can be moved in and out of the cooling unit and the upstanding walls 8 will be of suitable rigidity to hold the water but still being flexible enough to permit easy discharge of the ice cubes.

In Fig. 5 I have illustrated one manner of carrying out the novel method involved in the structure as shown in Fig. 1 or even in Fig. 2. In the diagrammatic view illustrated, the flexible tray is shown as being flexed so as to distort the walls thereof and free the ice cubes.

It will thus be seen that I have provided a novel sharp freezing container for ice cubes and the like, which is formed of a material having relatively small affinity for the ice and not readily wettable by water but also being flexible in varying degrees so as to permit easy discharge of the ice cubes therefrom. It will be understood that the flexibility and even the flexible material itself may vary within wide limits according to the nature of the frozen article or articles and the size and shape thereof, it being obvious that in some instances it may be desirable to have an entire tray formed of rubber without the inner connecting partitions so that a single large hunk of ice or other frozen substance may be quickly removed therefrom by merely distorting or flexing the material of the container.

What I claim is:

1. As a new article of manufacture, a sharp freezing container of the type adapted to be positioned in heat conducting relation with the "lowside" of a mechanical refrigerating system, said container having partitions formed integrally with the side walls of the container for dividing the container into ice cube-forming chambers, the surfaces of said partitions and the side walls of said container being formed of a permanent material to which ice does not readily adhere and being transversely distortable to permit easy removal of the ice cubes.

2. As a new article of manufacture, a sharp freezing container of the type adapted to be positioned in heat conducting relation with the low side of a mechanical refrigerating system, said container having partitions for dividing the container into a plurality of ice cube forming chambers, said partitions being formed at least in part of a non-metallic elastic material not readily wettable by water whereby to permit easy removal of the frozen article or articles.

3. As a new article of manufacture, a sharp freezing container of the type adapted to be positioned in heat exchange relation with the cooling unit of a mechanical refrigerating system, said container being relatively small so as to be readily handled and manipulated by the fingers and thumb and formed of non-metallic, easily distortable, self-supporting material to which ice does not readily adhere, whereby to permit easy removal of the frozen article or articles by distortion of all or part of said container by the hand.

4. A sharp freezing container of the type adapted to be removably positioned in heat exchange relation with the cooling unit of a mechanical refrigerating system, comprising molded walls for defining the shape and size of the article or articles to be frozen, and formed of a highly elastic material to which ice does not readily adhere whereby the frozen article or articles may be readily removed by simply manipulating the container.

5. As a new article of manufacture, a sharp freezing container of the type adapted to be removably positioned in heat exchange relation with the low side of a mechanical refrigerating system, said container being formed of easily deformable material inherently self-supporting and having at least some of the sides thereof formed of rubber to permit easy removal of the frozen article or articles by distortion of the container.

6. A container of the type adapted to be inserted in heat exchange relation with the cooling unit of a mechanical refrigerating system, comprising walls molded to form a series of compartments, at least some of said walls of each compartment being formed of a readily distortable material to which ice does not readily adhere to permit easy removal of the frozen article or articles.

7. As a new article of manufacture, a sharp freezing container of the type adapted to be positioned in heat exchange relation with the low side of a mechanical refrigerating system, said container having partitions for dividing the container into a plurality of ice cube forming chambers, said partitions being formed of non-metallic, easily distortable, self-supporting material to which ice does not readily adhere, whereby to permit easy removable of the ice cubes therefrom.

LLOYD G. COPEMAN.